Oct. 14, 1958  E. W. SIMONS  2,855,760
METHOD AND MEANS FOR MAINTAINING MATERIAL AT A PREDETERMINED
TEMPERATURE IN AN OPEN COMPARTMENT
Filed Oct. 3, 1956
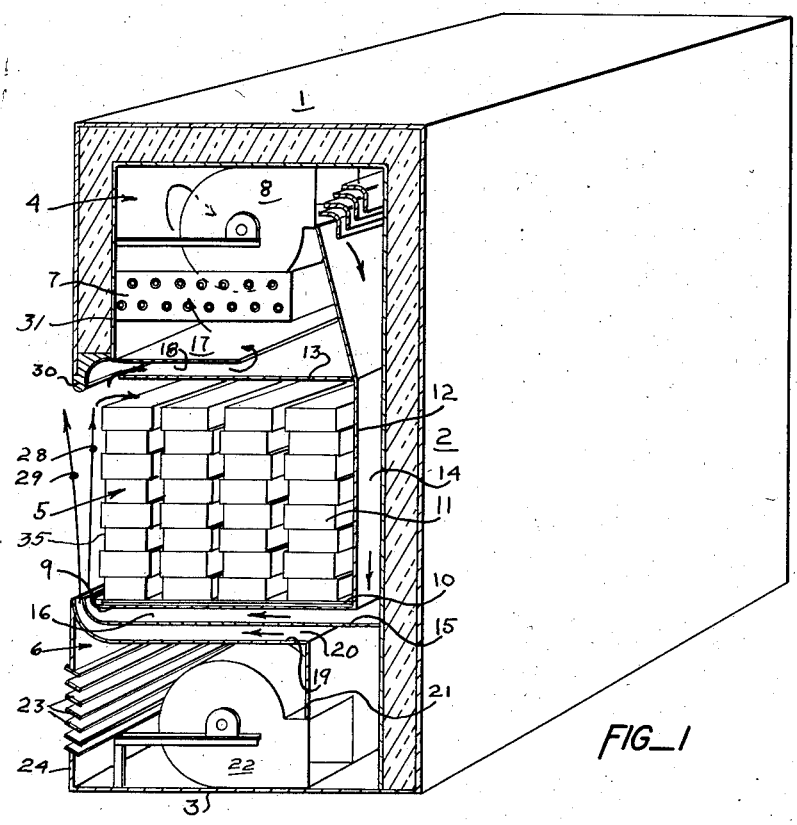
FIG_1
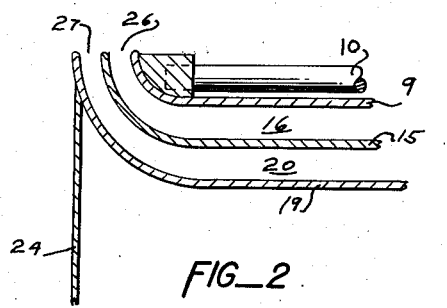
FIG_2
INVENTOR.
EDWARD W. SIMONS
BY
ATTORNEYS United States Patent Office 2,855,760
Patented Oct. 14, 1958

2,855,760

METHOD AND MEANS FOR MAINTAINING MATERIAL AT A PREDETERMINED TEMPERATURE IN AN OPEN COMPARTMENT

Edward W. Simons, San Francisco, Calif.

Application October 3, 1956, Serial No. 613,639

9 Claims. (Cl. 62—89)

This invention relates to a method and means for maintaining material at a predetermined temperature, other than atmospheric, in a compartment that has an open side.

The use of the word "material" is intended to include material of any kind, although the invention is particularly adapted for immediate use in the refrigerated or frozen food field, where, at the present time, most attempts to maintain the frozen products at proper temperatures have been directed toward storing and displaying them in cabinets that have open tops, and closed lateral sides.

The employment of the open top cabinet presents objections long known to the industry. A few of these are obvious, namely; goods in the cabinet are piled on top of each other, thus presenting only the top packages to view, and hiding those below; the customer must lean over the open top cabinet and reach down into it to obtain the desired package or objects; the goods are fully exposed to the influence of radiant heat through the open top; the obscuring of cartons or goods below the top layer results in some goods being handled to the point where they are unsaleable, due to injury and soiling; the cold walls of the cabinet or compartment in spaced opposition to the goods results in dehydration of food products and consequent impairment thereof.

One of the objects of the present invention is the provision of a method for more efficiently maintaining material at a predetermined temperature, other than atmospheric, within a compartment having an open side that is closed against a change in the temperature of the material within the compartment from the atmosphere, by convection, but open to the influence of radiant heat.

Another object of the invention is the provision of a method of maintaining material within a predetermined area having at least one side open to radiant heat, at a predetermined temperature substantially below atmospheric temperature and substantially free from the influence of radiant heat through said open side, and which side is open to access to said material but closed to the influence of atmospheric heat, by convection.

A still further object of the invention is the provision of a method of cooling the contents of a compartment by convection cooling at least one of the walls of said compartment at one side thereof while providing access to said material through another side and closing said last mentioned side against transmission of atmospheric heat therepast, by convection and shielding said material against the influence of radiant heat through said last mentioned side.

In a compartment having a laterally open side, I have found that frozen material positioned within said compartment at, for example, approximately 0° F. may be maintained in frozen condition by any suitable refrigerating means for maintaining the temperature of the air within the compartment at approximately 0° F., provided the open side is closed by a curtain of moving air of which the side of the curtain facing into said compartment is at approximately 0° F. and the side facing outwardly of the compartment is at approximately atmospheric temperature.

In such an arrangement, the open side of the compartment is not closed against the passage of radiant heat therethrough, and where the temperature within the compartment is maintained by a cold wall or ducts in spaced opposition to the material, heretofore there has been no means nor method for preventing dehydration of the material being cooled through the migration of ice or moisture therein from area of high vapor pressure remote from such wall or ducts to the surface or area of low vapor pressure nearest such wall or ducts.

Another object of the invention is the provision of a method and means for maintaining material within a compartment having an open side, at a temperature below freezing and free from the formation of frost on surfaces within said compartment.

An object of the invention is to provide a combination that overcomes the above difficulties and a method for overcoming them.

Other objects and advantages will appear in the description and in the drawings.

In the drawings Fig. 1 represents a cross sectional, perspective view of apparatus suitable for carrying out the method.

Fig. 2 is an enlarged sectional view of a portion of the cabinet of Fig. 1.

In detail, a cabinet may be employed having a top wall 1, rear wall 2, bottom wall 3, and opposed end walls (not shown).

Within the cabinet is an upper compartment 4, intermediate compartment 5 and lower compartment 6.

Within the upper compartment may be refrigeration coils 7 and one or more blowers 8.

The middle or intermediate compartment provides the area that is to be conditioned and within which the material to be cooled is positioned on a bottom wall 9, except that a grill 10 is preferably positioned above the bottom wall 9 for supporting the material 11.

The bottom wall 9 is connected with the end walls of the cabinet and extends to a rear wall 12 that forms the rear wall of the intermediate compartment 5, said rear wall 12 extends from bottom wall 9 upwardly in spaced relation to rear wall 2 of the cabinet and past the rear edge of top wall 13 of compartment 5 and into compartment 4 to the top wall 1 of the cabinet. The rear edge of top wall 13 of compartment 5 is connected with the wall 12, and the upper portion of wall 12 above the wall 13 preferably extends divergently upwardly relative to the rear wall 2 of the cabinet.

The upper portion of wall 12 is apertured for the outlet of a blower 8 and the said wall 12 and rear wall 2 of the cabinet form two of the opposite sides of a conduit 14 for air, which conduit extends to the rear edge of the bottom wall 9 of compartment 5.

A plate 15 spaced below the bottom wall 9 of compartment 5 extends from the forward side of said compartment to the rear wall 2 of the cabinet, and therefore plate 15 and bottom wall 9 form a continuation 16 of conduit 14.

Below the refrigeration coils 7 and above the top wall 13 is a plate 17 that extends from the front wall 31 of the upper compartment 4 over and spaced above the top wall 13 of compartment 5 to a point spaced from wall 12. Thus the wall 13 and plate 17 define opposite sides of a conduit 18 that is open at the forward side of the cabinet adjacent to the upper side of compartment 5, and open into upper compartment 4 adjacent to wall 12.

Air flowing through conduit 18 and into the upper compartment 4 must pass across the refrigeration coils 7 before entering the inlet to blower 8, and thus the conduits 14, 16 are the cold air conduits and a wall of each constitutes two of the walls of the compartment 5 and thereby conditions the air in compartment 5 to the desired temperature.

Below the plate 15 that forms the bottom side of conduit 16 is a plate or wall 19 that extends rearwardly from the forward lower side of compartment in spaced relation to the plate 15 for forming the lower side of a conduit 20. The rear edge of plate 19 terminates short of the rear wall 2 of the cabinet, and then extends downwardly at 21 to the bottom 3 of the cabinet.

A blower 22 is positioned within the lower compartment 6 and its outlet opens through wall 21 so that air from the blower will pass into and through conduit 20.

Inlet louvers 23 in the front wall 24 of compartment 6 provide for the entry of atmospheric air to the inlet of blower 22.

The forward edges of the bottom wall 9 of compartment 5, and wall 15 therebelow, and of the wall 19 that is below plate 15 are preferably directed upwardly as seen in Fig. 2 to provide a pair of elongated upwardly directed nozzles 26, 27 which extend in side by side relation along the lower edge of the open lateral forward side of compartment 5.

The air forced through conduits 16, 20 issues upwardly from said nozzles and across the forward open side of compartment 5 in a pair of contiguous layers 28, 29.

Directly above the pair of nozzles 26, 27 and along the forward lower edge of compartment 4, is a depending lip 30 which acts as a divider for maintaining the air layers separate.

The outer layer 29 of atmospheric air circulated by blower 22 is directed outwardly of the cabinet once it has passed over the open side of compartment 5, while the cold inner layer 28 is directed into the outer open end of conduit 18 for passage over the refrigeration coils and back to conduit 16 for ejection over the open side of the compartment.

The inner and outer layers 28, 29 form a curtain of moving air that closes the forward side of the compartment so that there is no transfer of heat, by convection, to the material 11 within compartment 5.

The speeds at which layers 28, 29 issue from nozzles 26, 27 may be easily adjusted by controlling the output of the fans to the relation at which no substantial entrainment takes place between the layers, and the material 11 thus faces a layer of air at substantially the temperature at which it is ejected from nozzle 26, which may be substantially —10° F., and which is adequate to maintain a temperature of approximately 0° F. within the compartment, since —10° F. would also be substantially the temperature of walls 9, 12 and 13. Little entrainment or none occurs between layers moving at substantially the same velocity.

Such amounts of the inner layer 28 as may enter the compartment 5, would keep the material 11 "sweet" and at the desired temperature.

With the arrangement above described, free access is had to the material 11 through the forward open side and where the material is in different separate packages, they can readily be removed through the lateral open side in the same manner as any packages or articles can be removed from conventional shelves. The labels are readable from their sides. The packages can be arranged so they will not interfere with one another.

While changes in the temperature of the material 11 within the compartment 5 from convection, due to the difference between the atmospheric temperature and the temperature within the compartment, have been eliminated the air curtain would not stop the transfer of heat by radiation. In order to reduce heat transfer to material 11 by radiation, the latter is enclosed in containers having a polished outer surface 35 that faces the open side of the compartment 5.

In explanation of the above, the Stefan-Boltzmann law is used to compute heat transfer due to radiation. With one surface at 90° F. radiating to a surface of 0° F., as a package of frozen food, heat transfer for a black body (emissivity of 1) would be, according to the Stefan-Boltzmann law, 81 B. t. u. per hour per square foot. The warmer body is the source and the colder body the sink. Ordinary materials have an emissivity of about 0.90 and two planes of this emissivity facing each other have an effective emissivity between them of 0.82, thus 0.82 times 81 B. t. u. per hour is 66.4 B. t. u. per hour by radiant transfer from a 90° F. surface to a 0° F. surface with ordinary materials. If one of the materials is made reflective with a relatively low emissivity of 0.05 the effective emissivity will still be about 0.05 since the reflecting material will tend to prevent most of the radiant heat transfer. Then, 81 B. t. u. per hour times 0.05 equals 4.1 B. t. u. per hour radiant transfer when the cold package or sink has a reflective surface of .05 facing the source. The difference between the 66.4 B. t. u. and the 4.1 leaves 62.3 B. t. u. per hour per square foot reduction in radiant transfer if an enclosure having a reflective outer surface of relatively low emissivity is used. This means that for every 50 square feet of exposed package behind the air jets there will be 3100 B. t. u. per hour of refrigeration saved. Since a ton of refrigeration is 12,000 B. t. u. per hour in rate of cooling the use of the reflective wrap would save approximately ¼ of a ton of refrigeration for every 50 square feet of exposed surface. A ton of refrigeration is the commercial unit of refrigeration and is based upon heat removal at a rate of 288,000 B. t. u. per day, or 12,000 B. t. u. per hour. It originates from the concept of removing 144 B. t. u. per pound of water to cause freezing at 32° F. and this amount applied to 2,000 lbs. of water (a ton) is 288,000 B. t. u. There is no present relationship between freezing at 32° F. and the ton of refrigeration. The rate is for removal of heat at any temperature level. The using of an enclosure having an outer surface of relatively low emissivity, of say from approximately 0.1 to approximately .05 would therefore decrease the size of the coil, the amount of air movement, the fan horsepower and the compressor horsepower. In a smaller refrigerating unit this might represent a saving of approximately ¾ horsepower in compressor input for each 50 square feet of exposed package. The reduced air circulation, because of reduced load, would probably bring the net saving up to 1 horsepower for 50 square feet of exposed package edge. If the reflective edge surface is not used radiant heat transfer will go to the package sides and then be wiped off by the slow convection of the air jets with ultimate removal in the cooling coils and extra cooling load.

In view of the foregoing, the outer surfaces of the material 11 that face the open side of compartment 5 may be made reflective by any means that would provide a relatively low emissivity. Polished aluminum, a metal foil, has a relatively low emissivity of approximately .05 and a laminated cardboard carton having an outer lamina of such foil at the side of the package or material facing the open side of the compartment would be suitable, or the material may be wrapped in such foil.

It is to be noted that the material 11 is supported on a grill and is therefore spaced above the bottom of the compartment. Also the material is spaced from the rear wall of the compartment. Since said rear and bottom walls would normally be quite cold, say approximately —10° F. in a typical system, whereas the interior of the compartment and the material 11 would be at approximately 0° F., a vapor pressure differential is created between the points of different temperature which results in a slow migration of ice from the portion of the material remote from these cold walls, to the sides of the material facing the cold walls in the absence of a remedy to stop such migration. This remedy is the employment of reflective outer surfaces of relatively low emissivity at the sides of the material facing the cold walls. The provision of such a surface will stop said migration of ice and the dehydration of the material that is shielded by the reflective surface.

In the case of frozen foods, for example, cartons may be used that have laminated walls, the outer lamina being a metal foil having a suitable reflective surface, or ordinary cartons may be covered with a foil wrapper, or shields having a reflective surface facing the open side of the compartment, and the cold walls of the latter may be employed. In the method, it is immaterial what structure is employed as long as there is a reflecting surface of low emissivity between the material and the sources of radiant heat facing said sources at least one of which is also separated from the sink or material by a two layer curtain of air of the character described.

In addition to providing a reflective surface of low emissivity at each side of the material that is in spaced opposed relation to a cold wall of the compartment, including the bottom surface that is against the grid, it is highly desirable that the surface of rear wall 12 facing the open side of the compartment be a polished reflective surface of low emissivity.

In other words, any surface within the compartment that faces the open side is preferably a surface of relatively low emissivity, such for example as approximately 0.1 and lower. Obviously the lower the emissivity the less radiant heat will be transferred. The reflective surfaces so positioned will retain their efficiency since the inner layer of air in the curtain is colder than said surfaces, being in a typical example approximately −10° F. whereas the temperature within the compartment may be approximately 0° F. Under such a condition the reflective surfaces will not become frosted because the vapors within the compartment will move to the air curtain where they will be picked up and carried to the cooling coil.

The foregoing makes apparent the cooperative relationship between the air curtain, as described, and any reflective surface within the compartment, facing said curtain, and one of which surfaces is the inner surface of the rear wall of the compartment.

The provision of the grid support for the material 11 spaces the material from the cold bottom of the compartment, hence the lower sides of the packages or enclosures for the material on said grid support preferably have a reflective outer surface of low emissivity comparable to the other surfaces that face the curtain and the rear and top walls of the compartment.

As already mentioned, some of the cold inner layer of air may enter the compartment if the nozzles are adjusted to permit such entry, and since the material 11 is supported above and spaced from the bottom of the compartment, some of this cold air will circulate below the material. In any event, the fact that the wall of cold air (inner layer) across the open side of the compartment is at a temperature below any surface within the compartment and below the temperature of the air in the compartment, vapors within the compartment will move to the inner layer of cold air for being carried to the cooling coil.

The example of surfaces having a low emissivity of from approximately 0.1 to approximately 0.05 is not restrictive to a low emissivity of .05 since a highly polished metal surface may have an emissivity, at the temperature involved, that is lower than .05, but any such emissivity is, for practical purposes, considered to be approximately .05.

It is to be understood that the precise description is not to be considered as being restrictive of the invention, since it is merely descriptive of a preferred form.

I claim:

1. The method of maintaining material at a predetermined temperature, other than atmospheric within a compartment having an open side that comprises the steps of; providing a surface of relatively low emissivity substantially fully covering any wall within said compartment that faces said open side, providing a covering having a reflective surface of relatively low emissivity across one side of said material with said surface facing outwardly of said material, positioning said material and covering within said compartment with said surface facing outwardly of the open side of said compartment and maintaining a pair of substantially contiguous layers of elastic fluid across said open side with one layer thereof being adjacent to said surface and being at a temperature substantially below atmospheric temperature and below the temperature of any such surface facing said curtain and the other layer thereof being outwardly of said one layer relative to said surface and substantially at atmospheric temperature.

2. The method of maintaining material at a predetermined temperature other than atmospheric temperature within a compartment having an open side that comprises the steps of: providing a covering having a reflective surface of relatively low emissivity across one side of said material with said surface facing outwardly of said material, positioning said material and covering within said compartment with said surface facing outwardly of the open side of said compartment and maintaining a curtain of two contiguous layers of moving air across said open side and spaced from said surface with the inner layer of said curtain adjacent to said surface being at a temperature other than atmospheric temperature and approximating said predetermined temperature and with the outer layer of said curtain at approximately atmospheic temperature.

3. The method of maintaining material within a compartment having an open side substantially at a predetermined temperature that comprises the steps of: providing coverings having reflective surfaces of relatively low emissivity across two sides of said material with said surfaces exposed and facing outwardly thereof, positioning said material and said coverings therefor within said compartments with one of said surfaces facing one wall of said compartment and with the other of said surfaces facing toward the open side of said compartment, moving a fluid at a temperature approximating said predetermined temperature in an enclosed path of travel along and in heat transfer relation to said one wall, maintaining a pair of contiguous layers of fluid across said open side with one layer thereof being adjacent to said other of said surfaces and being at a temperature approximating that of the fluid in said enclosed path and with the other layer of said pair being outside said one layer relative to said other surface and being at approximately atmospheric temperature.

4. The method of maintaining material within a compartment having an open side substantially at a predetermined temperature that comprises the steps of: providing coverings having reflective surfaces of relatively low emissivity across two sides of said material with said surfaces exposed and facing outwardly thereof, positioning said material and said coverings therefor within said compartments with one of said surfaces facing one wall of said compartment and with the other of said surfaces facing toward the open side of said compartment, moving a fluid at a temperature approximating said predetermined temperature in an enclosed path of travel along and in heat transfer relation to said one wall, maintaining a pair of contiguous layers of fluid across said open side with one layer thereof being adjacent to said other surface and being at a temperature approximating that of the fluid in said enclosed path and with the other layer of said pair being outside said one layer relative to said other surface and being at approximately atmospheric temperature, said one layer of said pair being fluid discharged from said enclosed path.

5. The method of maintaining material at a temperature below atmospheric temperature within a compartment having an open lateral side that comprises the steps of: enclosing said material within an enclosure having a reflective exposed outer surface of approximately .1 to .05 emissivity on one side thereof, positioning said enclosure with said material therein within said compartment with said surface facing said open lateral side, moving a pair of contiguous layers of air in the same direction across said open side with one layer of said pair adjacent to said enclosure and with the other layer of said pair remote from said enclosure, cooling said one layer and the air within said compartment to substantially below atmospheric temperature and said other layer being atmospheric air at approximately atmospheric temperature.

6. In combination with a compartment having a lateral open side, a container enclosing material to be held at a predetermined temperature other than atmospheric temperature, said container having one lateral side wall the outer exposed surface of which is of relatively low emissivity and said container being removably positioned within said compartment with said surface directed toward said lateral open side, a pair of conduits for air having a pair of elongated discharge apertures in side by side relation extending along one of the sides of said open side and directed across said open side for discharge of air across said open side, one aperture of said pair being adjacent to said container and the other being outwardly thereof relative to said container, means for supplying air at a temperature approximating said predetermined temperature to the one conduit of said pair thereof having said one aperture for discharge from the latter and means for supplying air at approximately atmospheric temperature to the other conduit having said other aperture for discharge from the latter.

7. In combination with a compartment having a lateral open side, a container enclosing material to be held at a predetermined temperature other than atmospheric temperature, said container having one lateral side wall the outer exposed surface of which is of relatively low emissivity, and said container being removably positioned within said compartment with said surface directed toward said lateral open side, a pair of conduits for air having a pair of elongated discharge apertures in side by side relation extending along one of the sides of said open side and directed across said open side for discharge of air across said open side, one aperture of said pair being adjacent to said container and the other being outwardly thereof relative to said container, means for supplying air at a temperature approximating said predetermined temperature to the one conduit of said pair thereof having said one aperture for discharge from the latter and means for supplying air at approximately atmospheric temperature to the other conduit having said other aperture for discharge from the latter, said one conduit having walls in heat transfer relation with the air inside said compartment to thereby contribute toward maintaining the temperature within said compartment at the desired temperature.

8. In combination with a compartment having a lateral open side, a bottom wall, a rear wall in spaced opposed relation to said open side, a top wall and a pair of spaced opposed lateral walls; an open work support over said bottom wall for supporting material thereon spaced above said bottom wall and for providing air passages between said bottom wall and such material, a pair of conduits for air having parallel elongated ejection nozzles extending along an edge of said open side and directed across said open side for discharge of air across the latter with one nozzle adjacent to the inside of the compartment and the other outwardly thereof, means for supplying air through one conduit of said pair to said one nozzle at a temperature below freezing, means for supplying air through the other conduit of said pair and to said other nozzle at a temperature substantially above freezing, one side of said one conduit being said bottom wall and said rear wall whereby air passing through said one conduit will be cooled by the air therein for cooling the air within said compartment by convection.

9. In combination with a compartment having a lateral open side, a bottom wall, a rear wall in spaced opposed relation to said open side, a top wall and a pair of spaced opposed lateral walls; an open work support over said bottom wall for supporting material thereon spaced above said bottom wall and for providing air passages between said bottom wall and such material, a pair of conduits for air having parallel elongated ejection nozzles extending along an edge of said open side and directed across said open side for discharge of air across the latter with one nozzle adjacent to the inside of the compartment and the other outwardly thereof, means for supplying air through one conduit of said pair to said one nozzle at a temperature below freezing, means for supplying air through the other conduit of said pair and to said other nozzle at a tempertaure substantially above freezing, one side of said one conduit being said bottom wall and said rear wall whereby air passing through said one conduit will be cooled by the air therein for cooling the air within said compartment by convection, enclosures within said compartment for holding material to be cooled, said enclosures having outer surfaces of relatively low emissivity below 0.1 in spaced opposed relation to said open side, rear wall and bottom wall.

References Cited in the file of this patent

UNITED STATES PATENTS

| | | |
|---|---|---|
| 2,241,854 | Hall | May 13, 1941 |
| 2,644,736 | Atchison | July 7, 1953 |
| 2,775,187 | McClurkin | Dec. 25, 1956 |